United States Patent
Monica et al.

(10) Patent No.: US 11,418,338 B2
(45) Date of Patent: Aug. 16, 2022

(54) CRYPTOASSET CUSTODIAL SYSTEM USING POWER DOWN OF HARDWARE TO PROTECT CRYPTOGRAPHIC KEYS

(71) Applicant: Anchor Labs, Inc., San Francisco, CA (US)

(72) Inventors: Diogo Monica, San Francisco, CA (US); Nathan P. McCauley, San Francisco, CA (US); Riyaz D. Faizullabhoy, Los Altos, CA (US)

(73) Assignee: Anchor Labs, Inc., San Francisco, CA (US)

( * ) Notice: Subject to any disclaimer, the term of this patent is extended or adjusted under 35 U.S.C. 154(b) by 817 days.

(21) Appl. No.: 16/254,199

(22) Filed: Jan. 22, 2019

(65) Prior Publication Data

US 2020/0235924 A1 Jul. 23, 2020

(51) Int. Cl.
*H04L 9/08* (2006.01)
*G06F 1/26* (2006.01)

(52) U.S. Cl.
CPC .............. *H04L 9/0894* (2013.01); *G06F 1/26* (2013.01)

(58) Field of Classification Search
CPC ................................. H04L 9/0894; G06F 1/26
USPC ......................................................... 380/277
See application file for complete search history.

(56) References Cited

U.S. PATENT DOCUMENTS

| | | | |
|---|---|---|---|
| 8,532,265 B2 * | 9/2013 | Wright ................. | H05K 7/1461 379/32.04 |
| 9,916,581 B2 | 3/2018 | Dorsey et al. | |
| 2012/0137158 A1 | 5/2012 | Nelluri et al. | |
| 2014/0156534 A1 | 6/2014 | Quigley et al. | |
| 2015/0170112 A1 | 6/2015 | DeCastro | |
| 2016/0261411 A1 | 9/2016 | Yau et al. | |
| 2016/0283920 A1 | 9/2016 | Fisher et al. | |
| 2017/0154331 A1 * | 6/2017 | Voorhees ................ | H04L 67/42 |

(Continued)

OTHER PUBLICATIONS

Cryptomathic.com [online], "Understanding Hardware Security Modules," Sep. 13, 2017, retrieved on Dec. 31, 2018, retrieved from: URL<https:www.cryptomathic.com/news-events/blog/understanding-hardware-security-modules-hsms>, 10 pages.

(Continued)

*Primary Examiner* — Noura Zoubair
*Assistant Examiner* — Phuc Pham
(74) *Attorney, Agent, or Firm* — Bookoff McAndrews, PLLC

(57) ABSTRACT

Methods, systems, and apparatus, including computer programs encoded on computer storage media, for a cryptoasset custodial system using power down of server computers to protect cryptographic keys. The cryptoasset custodial system includes a plurality of server computers. Each server computer of the plurality of server computers includes a volatile memory configured to store a cryptographic key associated with a cryptographic transaction to be performed, by the server computer, on a blockchain. A computing device is communicatively coupled to the volatile memory and configured to perform, using the cryptographic key, the cryptographic transaction on the blockchain. Responsive to detecting an interruption in an electrical power supply to the server computer, the stored cryptographic key is deleted from the volatile memory to prevent access to the cryptographic key.

20 Claims, 4 Drawing Sheets

(56) References Cited

U.S. PATENT DOCUMENTS

| | | |
|---|---|---|
| 2017/0373849 A1 | 12/2017 | Donner et al. |
| 2018/0018673 A1* | 1/2018 | Muchsel ................. G06F 21/73 |
| 2018/0130158 A1 | 5/2018 | Atkinson et al. |

OTHER PUBLICATIONS

Monica, "Crypto Anchors: Exfiltration Resistant Infrastructure," 11 pages, dated Oct. 8, 2017.
Monica, "Increasing Attacker Cost Using Immutable Infrastructure," 8 pages, dated Nov. 19, 2016.
Monica, "The two metrics that matter for host security," 6 pages, dated Aug. 31, 2017.
Wired.com [online], "Crypto anchors' might stop the next Equifax-style megabreach," Oct. 11, 2017, retrieved from: URLhttps://www.wired.com/story/crypto-anchors-breach-security/>, 11 pages.
PCT International Search Report and Written Opinion in International Appln. No. PCT/US2019/066587, dated Mar. 4, 2020, 14 pages.

* cited by examiner

300

```
┌─────────────────────────────────────────────────────────────────────┐
│ Derive, within a volatile memory of a hardware security module located within a │
│ server computer, a cryptographic key associated with a cryptographic transaction │
│         to be performed on a blockchain by the server computer      │
│                                 304                                 │
└─────────────────────────────────────────────────────────────────────┘
                                   │
                                   ▼
┌─────────────────────────────────────────────────────────────────────┐
│ Responsive to detecting a security breach of the server computer, transmit, using a │
│ security monitor, a power down signal to a power distribution unit to interrupt an │
│              electrical power supply to the server computer         │
│                                 308                                 │
└─────────────────────────────────────────────────────────────────────┘
                                   │
                                   ▼
┌─────────────────────────────────────────────────────────────────────┐
│ Responsive to detecting interruption of the electrical power supply to the server │
│ computer, delete the derived cryptographic key from the volatile memory of the │
│ hardware security module  to prevent access to the derived cryptographic key │
│                                 312                                 │
└─────────────────────────────────────────────────────────────────────┘
```

CRYPTOASSET CUSTODIAL SYSTEM USING POWER DOWN OF HARDWARE TO PROTECT CRYPTOGRAPHIC KEYS

FIELD OF THE INVENTION

This description relates generally to a cryptoasset custodial system using power down of hardware to protect cryptographic keys.

BACKGROUND

Cryptocurrencies such as Bitcoin, Ethereum, Ripple and others have gained in popularity and value in recent years and are expected by many to continue to do so. Every day an increasing variety of transactions are conducted based on cryptocurrencies, and it is conceivable that new types of cryptographic assets may be created in the future, i.e., cryptographic assets that are not necessarily currencies.

With the increasing use of cryptoassets comes the need for a trusted custodial system that can securely store very large quantities of cryptoassets and control access to those cryptoassets. Indeed, U.S. securities regulations require certain entities that hold more than a certain amount of funds (e.g., $150 million) on behalf of another party to use a custodian to hold those funds. Hardware wallets and other forms of "cold storage" are sometimes used to store cryptocurrency, however, those devices limit access only to the owner of the device and are therefore not suitable for many business uses, where a number of individuals may require access to cryptographic funds or other cryptoassets.

SUMMARY

This specification describes a cryptoasset custodial system using power down of hardware to protect cryptographic keys. The cryptoasset custodial system includes a plurality of server computers. Each server computer of the plurality of server computers is configured to store a cryptographic key within only a volatile memory located within the server computer. The cryptographic key is associated with a cryptographic transaction to be performed on a blockchain. A computing device is configured to perform, using the cryptographic key, the cryptographic transaction on the blockchain. Responsive to detecting an interruption in an electrical power supply to the server computer, the stored cryptographic key is deleted from the volatile memory to prevent access to the cryptographic key.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 3 illustrates an example process for operation of a cryptoasset custodial system using power down of hardware to protect cryptographic keys.

DETAILED DESCRIPTION

Figure 1:
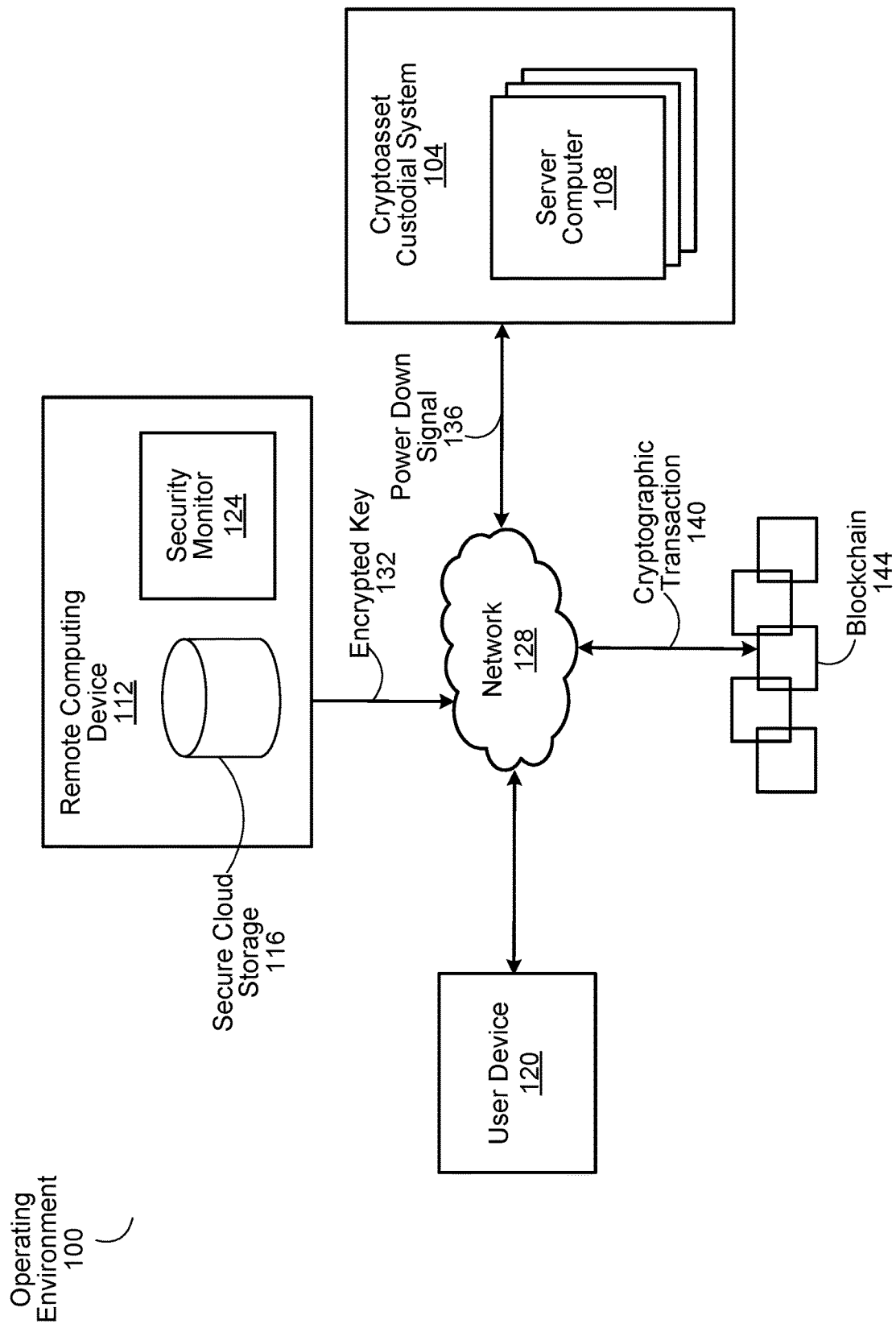
FIG. 1 illustrates an example block diagram of an operating environment for a cryptoasset custodial system using power down of hardware to protect cryptographic keys.

In the following description, for the purposes of explanation, numerous specific details are set forth in order to provide a thorough understanding of the disclosed embodiments. It will be apparent, however, that the embodiments may be practiced without these specific details.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description.

Example Operating Environment for a Cryptoasset Custodial System

FIG. 1 illustrates an example block diagram of an operating environment 100 for a cryptoasset custodial system 104 using power down of a server computer 108 to protect cryptographic keys. The operating environment 100 includes the cryptoasset custodial system 104, a remote computing device 112, a remote user device 120, and a blockchain 144. In other embodiments, the operating environment 100 includes additional or fewer components than those described herein.

The remote computing device 112 securely stores encrypted keys 132 for cryptographic transactions, e.g., cryptographic transaction 140. The encrypted keys 132 are stored within secure cloud storage 116 on the remote computing device 112. The remote computing device 112 is located remotely from the cryptoasset custodial system 104 as part of a cloud computing environment. Cloud computing is a model of service delivery for enabling convenient, on-demand network access to a shared pool of configurable computing resources (e.g. networks, network bandwidth, servers, processing resources such as the remote computing device 112, memory, cloud storage 116 such as for the encrypted keys 132, applications, virtual machines, and services). The remote computing device 112 and cloud computing services consumers are connected to the cryptoasset custodial system 104 through network links and network adapters. In some embodiments, the remote computing device 112 is implemented as various computing devices, for example servers, desktops, laptops, tablet, smartphones, and Internet of Things (IoT) devices. In an embodiment, the remote computing device 112 is implemented in or as a part of other systems.

In some embodiments, the remote computing device 112 includes a security monitor 124. The security monitor 124 is used to remotely power down hardware located within the cryptoasset custodial system 104 to protect cryptographic keys stored within volatile memories of the hardware. For example, in some embodiments, the hardware includes one or more computer servers 108 as illustrated in FIG. 1. In other embodiments, e.g., as illustrated and described with reference to FIG. 2 below, the security monitor 124 is located within the cryptoasset custodial system 104. In some embodiments, the security monitor 124 is implemented as a software module. In other embodiments, the security monitor 124 is implemented as various computing devices, for example servers, desktops, laptops, tablet, smartphones, and Internet of Things (IoT) devices. In some embodiments, the remote computing device 112 includes additional or fewer components than those described herein.

The security monitor 124 monitors information received from the cryptoasset custodial system 104, the one or more computer servers 108, or sensors located within the cryptoasset custodial system 104 to detect security breaches of the cryptoasset custodial system 104. For example, the security monitor 124 may detect that a malicious entity has hacked in to the one or more server computers 108 of the cryptoasset custodial system 104 or that there is malicious code present within the one or more server computers 108. In another example, the security monitor 124 may detect that a malicious entity has physically broken in to or tampered with hardware of the cryptoasset custodial system 104 to steal one or more cryptographic keys stored in the one or more computer servers 108. Responsive to the detecting of a security breach, the security monitor 124 transmits a power down signal 136 to a power distribution unit of the cryptoasset custodial system 104 to interrupt an electrical power supply to one or more of the computer servers 108. The interruption of the electrical power supply is used to delete one or more stored cryptographic keys from one or more volatile memories of the one or more computer servers 108 to prevent access to the one or more cryptographic keys by the malicious entity. In other embodiments, a remote operator may manually use the security monitor 124 to transmit the power down signal 136 remotely to the cryptoasset custodial system 104 to delete one or more stored cryptographic keys.

The blockchain 144 includes a growing list of cryptographic transaction records, called blocks, which are linked using cryptography. Each block includes a cryptographic hash of a previous block, a timestamp, and cryptographic transaction data. The blockchain 144 is typically managed by a peer-to-peer network collectively adhering to a protocol for inter-node communication and validating new blocks. Once recorded, the data in any given block cannot be altered retroactively without alteration of all subsequent blocks, which requires consensus of the network majority.

The cryptoasset custodial system 104 is used to control access to the blockchain 144 and perform cryptographic transactions 140 on the blockchain 144. The cryptoasset custodial system 104 is a computer-implemented system for maintaining custody of, and controlling access to, the blockchain 144, e.g., cryptocurrencies and/or other cryptoassets. The cryptoasset custodial system 104 may be owned and/or operated by a business enterprise, referred to herein as a Cryptoasset Custodian. The cryptoasset custodial system 104 includes multiple layers of security so as to enable large volumes of cryptoassets to be maintained in a secure manner. In certain embodiments the cryptoasset custodial system 104 includes a combination of biometric-based multi-user validation, transaction risk analysis, and use of the one or more computer servers 108 to provide authentication/validation functionality and secure storage of private keys of cryptoassets. Furthermore, two or more different biometric authentication techniques may be applied to any given transaction request.

In certain embodiments, when a user device 120 requests a transaction 140 involving a cryptoasset, such as a withdrawal of transfer of cryptocurrency funds, the cryptoasset custodial system 104 causes an endorsement request message to be sent to each of multiple user devices 120, each of which is associated with a different user who has been defined as potential member of a quorum for transactions involving that cryptoasset. In other embodiments, multiple users may share the same user device 120. The endorsement request message is configured to cause each receiving user device 120 to prompt its user to provide an endorsement of the requested transaction 140. An endorsement in this context is an approval or rejection of an operation by a user. When a user receiving such a prompt endorses the transaction 140 on his or her user device 120 (e.g., a smartphone, tablet or notebook computer), the user device 120 signs an endorsement message with a private key of that user and transmits the signed endorsement message to the cryptoasset custodial system 104. The private key is stored within a secure enclave within the user device 120. A secure enclave in each user device 120 is used to store the corresponding user's private key and to generate digital signatures of that user.

The one or more computer servers 108 may include hardware security modules that are special-purpose physical computing devices that safeguard and manage cryptographic keys for authentication and provide cryptoprocessing functionality. A hardware security module can be embodied as a plug-in card or an external device that attaches directly to a computer. In some embodiments, the hardware security module determines whether a policy-based quorum of multiple users has endorsed (approved) a requested transaction 140, such as a withdrawal or transfer of cryptocurrency funds. The hardware security module validates a signature by a public key of a public-private key pair for each of the plurality of users, in endorsement messages received from the users. Only after determining that the policy-based quorum of the multiple users has validly endorsed the requested transaction 140, the hardware security module then allows itself to access the cryptographic private key of that particular cryptoasset (e.g., for a specific deposit of cryptocurrency funds), which the hardware security module previously generated. The hardware security module uses the cryptographic private key to sign the transaction 140 as authorization that the transaction 140 may proceed. The cryptographic private key for the cryptoasset is stored only in volatile memory of the computer server 108, which does not permit the cryptographic key to be read by any entity outside the computer server 108. Approval of the transaction 140 may include, for example, transmitting the transaction 140 onto a known blockchain network 144. In certain embodiments, approval of the transaction 140 by the computer server 108 occurs only if and after the requested transaction 140 has passed a risk review, which may be partially or fully automated. Note also that it is contemplated the system and techniques introduced here can be used for secure custody of other types of digital assets besides cryptoassets.

In some embodiments, the computer server 108 receives, from the remote computing device 112, information representing a cryptographic transaction 140 to be performed. The information includes an encrypted key 132 associated with the cryptographic transaction 140. The computer server 108 derives, using the encrypted key 132, a cryptographic key within a volatile memory of the computer server 108. The computer server 108 is configured to store the derived cryptographic key within only the volatile memory located within the computer server 108. The stored cryptographic key is associated with the cryptographic transaction 140 to be performed on the blockchain 144. Responsive to detecting an interruption in the electrical power supply to the computer server 108, the stored cryptographic key is deleted from the volatile memory to prevent access to the cryptographic key.

The network 128 includes networking resources (for example, networking equipment, nodes, routers, switches, and networking cables) that interconnect the cryptoasset custodial system 104, the remote computing device 112, the user device 120, and the blockchain 144 and help facilitate access for the cryptoasset custodial system 104 to cloud computing services. In an embodiment, the network 128 represents any combination of one or more local networks, wide area networks, or internetworks coupled using wired or wireless links deployed using terrestrial or satellite connections. Data exchanged over the network 128, is transferred using any number of network layer protocols, such as Internet Protocol (IP), Multiprotocol Label Switching (MPLS), Asynchronous Transfer Mode (ATM), Frame Relay, etc. Furthermore, in embodiments where the network 128 represents a combination of multiple sub-networks, different network layer protocols are used at each of the underlying sub-networks. In some embodiments, the network 128 represents one or more interconnected internetworks, such as the public Internet.

Architecture for a Cryptoasset Custodial System

Figure 2:
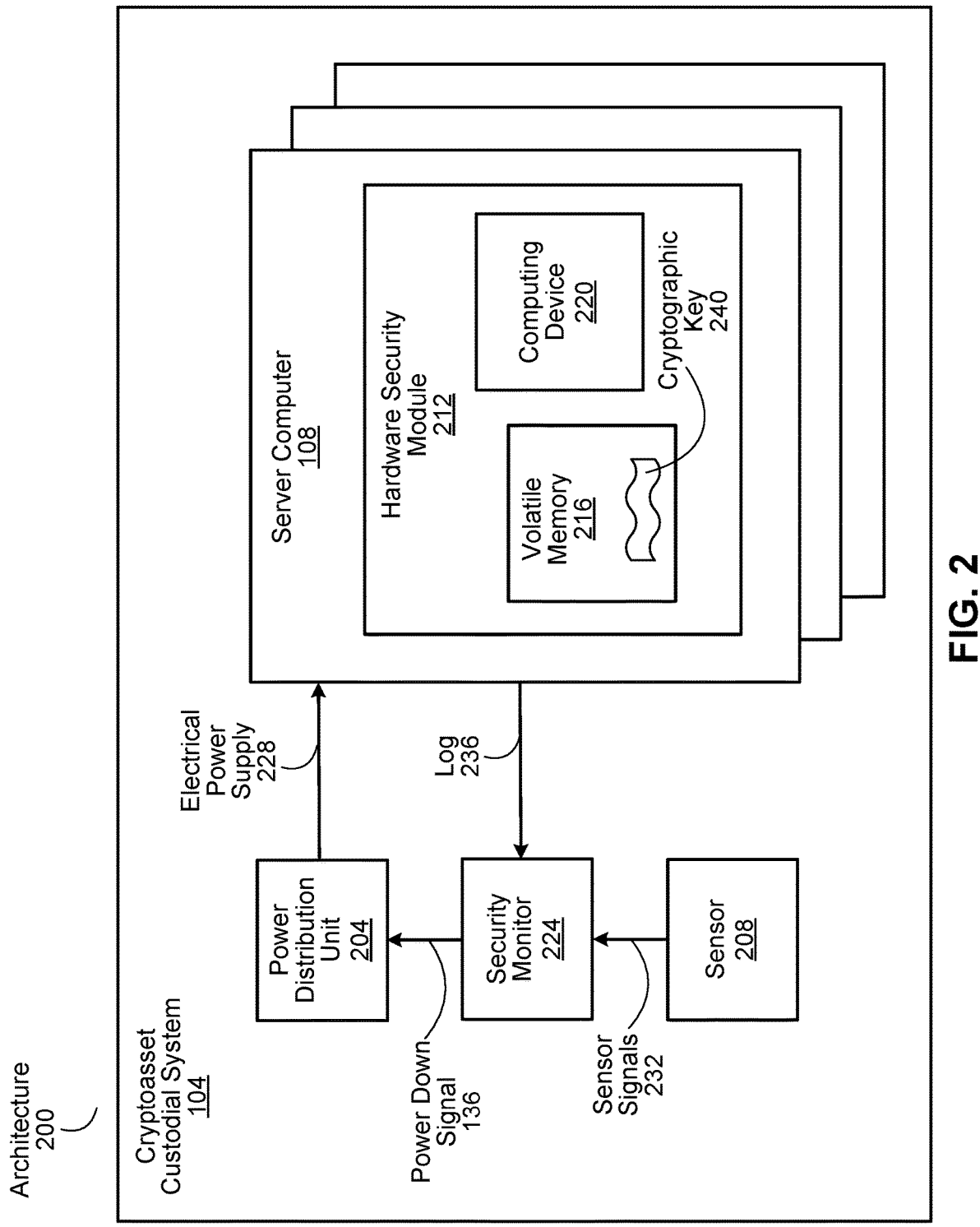
FIG. 2 illustrates an example block diagram of an architecture for a cryptoasset custodial system using power down of hardware to protect cryptographic keys.

FIG. 2 illustrates an example block diagram of an architecture 200 for a cryptoasset custodial system 104 using power down of one or more hardware security modules 212 to protect one or more cryptographic keys 240. The architecture 200 includes one or more server computers 108, a power distribution unit 204, a security monitor 224, and a sensor 208. In other embodiments, the architecture 200 includes additional or fewer components than those described herein.

The cryptoasset custodial system 104 includes one or more server computers 108 to provide cryptographic processing of transactions 140 on the blockchain 144. Each server computer 108 is electrically connected to a power slot of the power distribution unit 204 to receive an electrical power supply 228. The server computer 108 is communicatively coupled to the security monitor 224 to transmit information, such as a log 236 of the hardware security module 212 to the security monitor 224. The server computer 108 includes the hardware security module 212, software, and a computing device 220 that provides cryptographic processing functionality for remote user devices 120 that request a transaction 140 on the blockchain 144. The computing device 220 is communicatively coupled to the volatile memory 216 within the hardware security module 212. In other embodiments, the server computer 108 includes additional or fewer components than those described herein.

The hardware security module 212 generates and stores one or more cryptographic keys 240 in a volatile memory 216 of the hardware security module 212 for cryptographic processing. In some embodiments, the cryptographic key 240 is a private key of an asymmetric cryptographic key pair associated with a cryptographic transaction 140 and usable to control access to the blockchain 144. The volatile memory 216 is computer memory that requires the electrical power supply 228 to maintain the stored information (the cryptographic key 240). The volatile memory 216 may include static random access memory (SRAM), dynamic RAM (DRAM), spin-transfer torque RAM (STT-RAM), or magnetoresistive RAM (MRAM).

The remote computing device 112 may receive a request to perform the transaction 140 and a list of endorsements from user devices 120. The remote computing device 112 also receives an identifier of a cryptoasset for the transaction 140. The remote computing device 112 transmits information including the encrypted key 132 associated with the cryptographic transaction 140 and the identifier of the cryptoasset to the cryptoasset custodial system 104. The hardware security module 212 is configured to receive, from the remote computing device 112, the information representing the cryptographic transaction 140 to be performed by the server computer 108.

The hardware security module 212 derives, using the encrypted key 132, the cryptographic key 240 associated with the cryptographic transaction 140 within the volatile memory 216. In some embodiments, the hardware security module 212 uses a master key to remove encryption from the encrypted key 132 to generate the cryptographic key 240. In some embodiments, the derivation and generation of the cryptographic key 240 is performed entirely in the volatile memory 216 of the hardware security module 212. The computing device 220 performs, using the cryptographic key 240, the cryptographic transaction 140 on the blockchain 144. For example, the computing device 220 signs the transaction 140 transferring the cryptoasset and returns the signed transaction 140 to the cloud, which in turn broadcasts the signed transaction 140 for inclusion in the blockchain 144. The hardware security module 212 clears all the transaction parameters (e.g., the encrypted key 132 and the identifier of the cryptoasset) as well as the cryptographic key 240 from the volatile memory 216 and awaits the next request.

In some embodiments, the hardware security module 212 is configured to generate a log 236 representing performance of the cryptographic transaction 140. The hardware security module 212 therefore provides a logging and altering function in the form of tamper evidence, auditing, and log traces. For example, each transaction 140 submitted to the cryptoasset custodial system 104 may be recorded in the internal log 236 that is tamper-resistant and that allows auditors to have cryptographic proof of historical events on each user's account. The log 236 may include identifiers of the cryptoassets transacted, the blockchain 144, the transactions 140, the user devices 120 used, and the remote computing devices 112 used.

The power distribution unit 204 provides the electrical power supply 228 to the one or more server computers 108. The power distribution unit 204 is electrically connected to the server computers 108 to provide the electrical power supply 228. The power distribution unit 204 is a device fitted with multiple power slots (outputs) designed to distribute electric power to racks of the server computers 108 and networking equipment located within the cryptoasset custodial system 104. In some embodiments, the power distribution unit 204 addresses challenges faced by the cryptoasset custodial system 104 in power protection and management by monitoring the electrical power supply 228 to improve efficiency, uptime, and growth.

The power distribution unit 204 is electrically connected to the server computers 108 using a plurality of power slots. In some embodiments, the power distribution unit 204 provides the electrical power supply 228 to each server computer 108 using a distinct power slot for the server computer 108. The power distribution unit 204 is configured to interrupt the electrical power supply 228 to a particular server computer, using the distinct power slot, while continuing to provide, using other power slots of the plurality of power slots, the electrical power supply 228 to other server computers of the cryptoasset custodial system 104. Using a unique address for each power slot, the power distribution unit 204 can therefore programmably interrupt the electrical power supply 228 to one or more server computers 108. The computing device 220 of the server computer 108 whose power is interrupted can then delete the stored cryptographic key 240 from the volatile memory 216 of the hardware security module 212 of the server computer 108. Therefore, the hardware security module 212 can prevent access to the cryptographic key 240 in the event of a security breach. A server computer that is not breached is not shut down and can continue to provide cryptographic processing, thereby increasing computational efficiency.

The security monitor 224 is used to power down the server computer 108 to delete the cryptographic key 240 from the volatile memory 216 of the hardware security module 212. The security monitor 224 may be an example of the security monitor 124 illustrated and described above with reference to FIG. 1. The security monitor 224 can power down a particular server computer connected to a distinct power slot of the power distribution unit 204 to delete a particular cryptographic key from a particular hardware security module. The security monitor 224 is communicatively coupled to the server computers 108 to receive the log 236 from the server computers 108. The security monitor 224 is communicatively coupled to the power distribution unit 204 to transmit a power down signal 136 to the power distribution unit 204. Portions of the security monitor 224 may be implemented in software or hardware. For example, the security monitor 224 or a portion of the security monitor 224 may be part of a PC, a tablet PC, an internet of things (IoT) appliance, or any machine capable of executing instructions that specify actions to be taken by that machine. In some embodiments, the security monitor 224 is part of the cryptoasset custodial system 104 as illustrated with reference to FIG. 2. In other embodiments, the security monitor 224 is located on a remote computing device 112 as illustrated and described above with reference to FIG. 1.

The security monitor 224 detects a security breach of the server computer 108 or the cryptoasset custodial system 104. For example, the security monitor 224 may examine the log 236 to uncover a software security breach of the server computer 108 by detecting an unauthorized cryptographic transaction, an access attempt by an unauthorized or malicious entity, or the presence of malicious code such as malware on the server computer 108. In some embodiments, the sensor 208 generates sensor signals 232 indicative of a security breach of one or more of the server computers 108. The sensor 208 may be a camera that captures a picture of a physical intruder, a noise detector, a vibration detector, a heat sensor, or any other type of sensor that senses a physical disturbance in the cryptoasset custodial system 104 and generates sensor signals 232 indicative of a security breach. The security monitor 224 may examine the sensor signals 232 to uncover a physical security breach of the server computer 108 by detecting unusual or unauthorized physical activities or events.

In some embodiments, once a user device 120 endorses a transaction request, the user may be subjected to one or more forms of authentication by the user device 120 and/or the cryptoasset custodial system 104, to establish the user's identity. The authentication forms may include one or more biometric authentication techniques, such as fingerprint verification, voiceprint verification, speech recognition, facial recognition and/or gesture recognition. The user device 120 (e.g., smartphone) may perform one or more of these authentication techniques.

Additionally, or alternatively, the user may be required to upload to the cryptoasset custodial system 104 a video, captured by the user device 120, from which the identity of the user can be proven by, for example: identifying the user's face in the video against images of known faces (e.g., previous videos of the user); identifying the user's voice in the video against their trained voice profile; requiring the user to say certain words or take certain actions in the video based on the transaction (see further discussion below); requiring the user to make a previously specified gesture, or a distress gesture if they are in distress; requiring the user to identify on video the expected room they are in; and/or other performing any other actions that are considered to increase the level of confidence that the user is who he or she purports to be.

When determined to be necessary, a user may be asked to complete challenges to authenticate that he or she is in fact the person who is authorized to act on the transaction 140. These challenges may be generated deterministically based on the context of the transaction 140. For example, based on critical information in a transaction 140 such as the ID, amount, destination, etc., the cryptoasset custodial system 104 may generate a random number that can be used to select a few (e.g., three to five) words from a set of known words. The cryptoasset custodial system 104 may present those words to the user and have the user speak them in a video captured by the user device 120, which the user device 120 then transmits to the cryptoasset custodial system 104. When reviewing the log 236, the security monitor 224 can generate the expected words based on transaction data and verify that the user spoke those words. The video can also be subject to facial and/or voice recognition. By performing this type of deterministic challenge generation, the security monitor 224 can detect a security breach of the cryptoasset custodial system 104 or of a particular server computer.

Responsive to the detecting of a security breach on a particular server computer 108, the security monitor 224 transmits a power down signal 136 to the power distribution unit 204 to interrupt the electrical power supply 228 to the server computer 108. The server computer 108 deletes the cryptographic key 240 stored in the volatile memory 216 of the particular hardware security module 212. In some embodiments, an operator can use the security monitor 224 to manually power down a server computer 108 even when there is no security breach. For example, the cryptoasset custodial system 104 can include human review of cryptographic transactions 140 and administrative user operations. A security application programming interface (API) can provide integration with an internal risk dashboard, for human employees of a Cryptoasset Custodian to manually review each transaction 140.

In certain embodiments, all transactions are manually approved by designated employee(s), all administrative user operations (adding, removing, permission changes) are manually approved by other designated employee(s), reviewable entities must have passed an automated verification process before requiring risk analysis, reviewable entities must provide robust context about the user approvals for both human and further automated inspection, and risk approvals and denials are logged in the log 236 for auditability.

The security API can receive contextual data about each user involved in a transaction 140 to present to a human and/or classification system. This information may include, for example, user(s) who approved the transaction 140, time of approval(s), location of approval(s), and device/key ID(s) that approved the transaction 140. This data can be fed into an internal risk analysis dashboard, and possibly other automated review systems. If a reviewing operator detects a security breach or even if there is no security breach, the security monitor 224 can be used to remotely power down a particular server computer 108 of the cryptoasset custodial system 104 to prevent access to the cryptographic key 240.

Among other benefits and advantages, the embodiments disclosed herein provide increased security for digital asset keys stored in hardware security modules in physical datacenters. If a physical data-center is breached by a malicious entity, the embodiments enable remote power down of the datacenter. When the datacenter is powered down, the digital asset keys are deleted because they are only stored in volatile memory as opposed to being stored on-disk. A physical attacker will therefore be unable to recover the digital asset keys post power down. The power distribution unit disclosed is programmable, such that server computers connected to individual power slots of the power distribution unit can be powered down individually. The security monitor can remotely manage the power distribution unit for a datacenter, specifically targeting individual server computers. Therefore, a server computer that is not breached would not be powered down and can continue to provide cryptographic processing, thereby increasing computational efficiency. The server computers operate on the cryptographic keys only in the volatile memory. The cryptographic keys are generated on the fly and are not stored on a disk. Therefore, the embodiments prevent access to the cryptographic keys in the event of a breach by wiping the cryptographic keys from the volatile memory when a server computer is powered down.

Process for Operation of a Cryptoasset Custodial System

FIG. 3 illustrates an example process 300 for operation of a cryptoasset custodial system 104 using power down of a hardware security module 212 to protect a cryptographic key 240. In one embodiment, the process of FIG. 300 is performed by the cryptoasset custodial system 104. Other entities, for example, a security module 124 located on a remote computing device 112 perform some or all of the steps of the process 300 in other embodiments. Likewise, embodiments may include different and/or additional steps, or perform the steps in different orders.

The cryptoasset custodial system 104 derives 304, within a volatile memory 216 of a hardware security module 212 located within a server computer 108, a cryptographic key 240. The cryptographic key 240 is associated with a cryptographic transaction 140 to be performed on a blockchain 144 by the server computer 108. In some embodiments, the hardware security module 212 uses a master key to remove encryption from an encrypted key 132 to generate the cryptographic key 240. In some embodiments, the derivation and generation of the cryptographic key 240 is performed entirely in the volatile memory 216 of the hardware security module 212.

Responsive to detecting a security breach of the server computer 108, the cryptoasset custodial system 104 transmits 308, using a security monitor 224, a power down signal 136 to a power distribution unit 204 to interrupt an electrical power supply 228 to the server computer 108. The volatile memory 216 is computer memory that requires the electrical power supply 228 to maintain the stored information (the cryptographic key 240).

Responsive to detecting interruption of the electrical power supply 228 to the server computer 108, the cryptoasset custodial system 104 deletes 312 the derived cryptographic key 240 from the volatile memory 216 of the hardware security module 212 to prevent access to the derived cryptographic key 240. If a physical data-center is breached by a malicious entity, the cryptoasset custodial system 104 enables remote power down of the hardware security module 212 and the volatile memory 216. When the hardware security module 212 is powered down, the cryptographic key 240 is deleted because it is stored in only the volatile memory 216 as opposed to being stored on-disk. A physical attacker or software hacker will therefore be unable to recover the cryptographic key 240 post power down. Moreover, if a malicious entity physically steals a server computer 108 or a hardware security module 212 but is unable to maintain a persistent electrical power supply 228 to the hardware security module 212, the hardware security module 212 will be powered down and the cryptographic key 240 will be deleted.

Hardware Architecture of a Processing System

Figure 4:
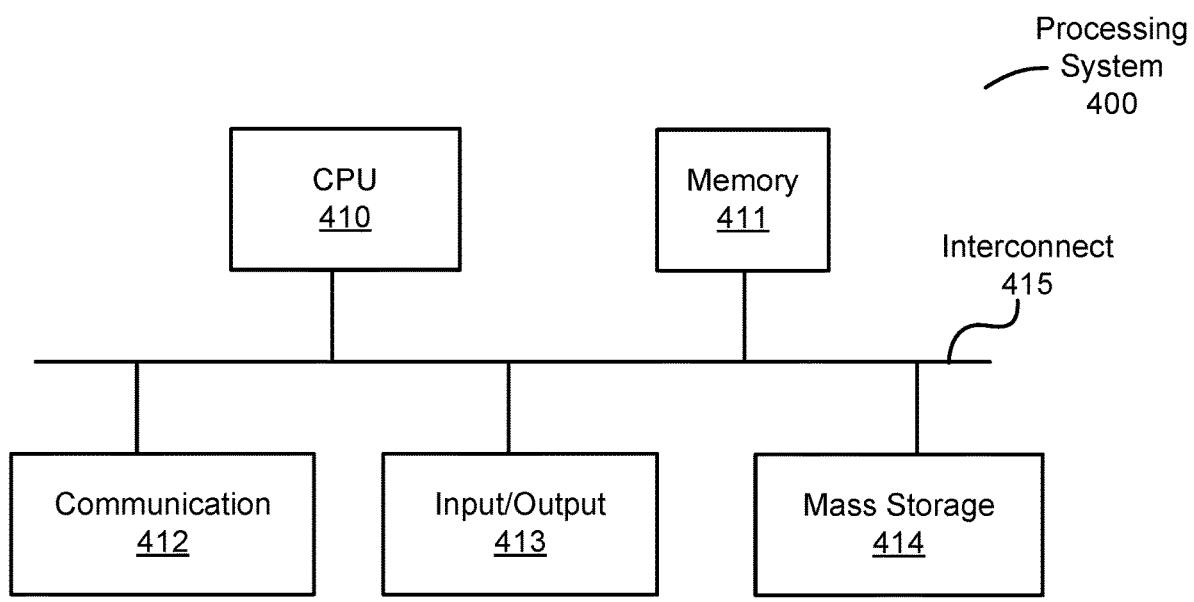
FIG. 4 illustrates an example high-level block diagram of a hardware architecture of a processing system that can be used to implement some or all of a cryptoasset custodial system using power down of hardware to protect cryptographic keys.

FIG. 4 illustrates an example high-level block diagram of a hardware architecture of a processing system 400 that can be used to implement some or all of the cryptoasset custodial system 104, the remote computing device 112, the security monitor 124, or the user device 120. The cryptoasset custodial system 104 can include one or more instances of an architecture such as shown in FIG. 4, where multiple such instances can be coupled to each other via one or more private networks.

The illustrated processing system 400 includes one or more processors, including a CPU 410, one or more memories 411 (at least a portion of which may be used as working memory, e.g., random access memory (RAM)), one or more data communication device(s) 412, one or more input/output (I/O) devices 413, and one or more mass storage devices 414, all coupled to each other through an interconnect 415. The interconnect 415 may be or include one or more conductive traces, buses, point-to-point connections, controllers, adapters and/or other conventional connection devices. Each processor 410 controls part of the operation of the processing device 400 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 411 can be or include one or more physical storage devices, which may be in the form of RAM, read-only memory (ROM) (which may be erasable and programmable), flash memory, miniature hard disk drive, or other suitable type of storage device, or a combination of such devices. Each mass storage device 414 can be or include one or more hard drives, digital versatile disks (DVDs), flash memories, or the like. Each memory 411 and/or mass storage 414 can store (individually or collectively) data and instructions that configure the processor(s) 410 to execute operations to implement the techniques described above. Each communication device 412 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 400, each I/O device 413 can be or include a device such as a display (which may include a transparent AR display surface), audio speaker, keyboard, mouse or other pointing device, microphone, camera, etc. Note, however, that such I/O devices may be unnecessary if the processing device 400 is embodied solely as a server computer.

In the case of a user device, a communication device 412 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 412 can be or include, for example, any of the aforementioned types of communication devices, a wired Ethernet adapter, cable modem, DSL modem, or the like, or a combination of such devices.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose ("hardwired") circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., RAM or ROM; magnetic disk storage media; optical storage media; flash memory devices; etc.), etc.

The term "logic", as used herein, means: i) special-purpose hardwired circuitry, such as one or more application-specific integrated circuits (ASICs), programmable logic devices (PLDs), field programmable gate arrays (FPGAs), or other similar device(s); ii) programmable circuitry programmed with software and/or firmware, such as one or more programmed general-purpose microprocessors, digital signal processors (DSPs) and/or microcontrollers, system-on-a-chip systems (SOCs), or other similar device(s); or iii) a combination of the forms mentioned in i) and ii).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A system comprising:
    a plurality of server computers, each server computer of the plurality of server computers comprising:
        a hardware security module comprising:
            a volatile memory configured to store a cryptographic key associated with a cryptographic transaction to be performed, by the server computer, on a blockchain, the cryptographic key stored only within the volatile memory and inaccessible to devices external to the hardware security module; and
            a computing device communicatively coupled to the volatile memory and configured to:
                perform, using the cryptographic key, the cryptographic transaction on the blockchain; and
                responsive to detecting an interruption in an electrical power supply to the server computer, delete the stored cryptographic key from the volatile memory to prevent access to the cryptographic key.

2. The system of claim 1, further comprising:
a power distribution unit electrically connected to the plurality of server computers and configured to:
interrupt the electrical power supply to at least one server computer of the plurality of server computers to delete at least one stored cryptographic key from at least one volatile memory of at least one hardware security module of the at least one server computer.

3. The system of claim 1, wherein the hardware security module is further configured to generate a log representing performance of the cryptographic transaction, the system further comprising:
a power distribution unit electrically connected to the plurality of server computers and configured to provide the electrical power supply to the plurality of server computers; and
a security monitor communicatively coupled to the plurality of server computers and the power distribution unit and configured to:
detect, using the log, a security breach of the server computer; and
responsive to the detecting of the security breach, transmit a power down signal to the power distribution unit to interrupt the electrical power supply to the server computer.

4. The system of claim 1, further comprising:
a power distribution unit electrically connected to the plurality of server computers and configured to provide the electrical power supply to the plurality of server computers;
a sensor configured to generate sensor signals indicative of a security breach of the server computer; and
a security monitor communicatively coupled to the sensor and the power distribution unit and configured to:
detect, using the sensor signals, the security breach; and
responsive to the detecting of the security breach, transmit a power down signal to the power distribution unit to interrupt the electrical power supply to the server computer.

5. The system of claim 1, wherein the cryptographic key comprises:
a private key of an asymmetric cryptographic key pair associated with the cryptographic transaction and usable to control access to the blockchain.

6. The system of claim 1, further comprising:
a power distribution unit electrically connected to the plurality of server computers using a plurality of power slots, wherein:
the power distribution unit is configured to interrupt the electrical power supply to the server computer, using a distinct power slot of the plurality of power slots, while providing, using other power slots of the plurality of power slots, the electrical power supply to other server computers of the plurality of server computers.

7. The system of claim 1, wherein the hardware security module is configured to:
receive, from a remote computing device, information representing the cryptographic transaction to be performed by the server computer, wherein the information comprises an encrypted key associated with the cryptographic transaction; and
derive, using the encrypted key, the cryptographic key within the volatile memory.

8. A method comprising:
deriving, within a volatile memory of a hardware security module located within a server computer, a cryptographic key associated with a cryptographic transaction to be performed on a blockchain by the server computer, the cryptographic key stored only within the volatile memory and inaccessible to devices external to the hardware security module;
storing, using the hardware security module, the cryptographic key within only the volatile memory; and
responsive to detecting interruption of an electrical power supply to the server computer, deleting the stored cryptographic key from the volatile memory to prevent access to the cryptographic key.

9. The method of claim 8, further comprising:
interrupting, using a power distribution unit electrically connected to a plurality of server computers, the electrical power supply to at least one server computer of the plurality of server computers to delete at least one stored cryptographic key from at least one volatile memory of at least one hardware security module of the at least one server computer.

10. The method of claim 8, further comprising:
generating, using the hardware security module, a log representing performance of the cryptographic transaction;
detecting, using the log, a security breach of the server computer; and
responsive to the detecting of the security breach, transmitting a power down signal to a power distribution unit to interrupt the electrical power supply to the server computer.

11. The method of claim 8, further comprising:
generating, using a sensor, sensor signals indicative of a security breach of the server computer;
detecting, using the sensor signals, the security breach; and
responsive to the detecting of the security breach, transmitting a power down signal to a power distribution unit to interrupt the electrical power supply to the server computer.

12. The method of claim 8, further comprising:
receiving, from a security monitor located remotely from the server computer, a power down signal to interrupt, using a power distribution unit, the electrical power supply to the server computer.

13. The method of claim 8, wherein the cryptographic key comprises a private key of an asymmetric cryptographic key pair associated with the cryptographic transaction and usable to control access to the blockchain.

14. The method of claim 8, wherein the server computer is one of a plurality of server computers electrically connected to a power distribution unit using a plurality of power slots, the method further comprising:
interrupting, using a distinct power slot of the plurality of power slots, the electrical power supply to the server computer, while providing, using other power slots of the plurality of power slots, the electrical power supply to other server computers of the plurality of server computers.

15. The method of claim 8, further comprising:
receiving, using the hardware security module, information representing the cryptographic transaction, the information comprising an encrypted key associated with the cryptographic transaction, wherein the deriving of the cryptographic key comprises:

generating, using the encrypted key, the cryptographic key.

16. A non-transitory computer-readable storage medium comprising instructions executable by a computer processor, the instructions comprising instructions to:
- derive, within a volatile memory of a server computer, a cryptographic key associated with a cryptographic transaction to be performed on a blockchain by the server computer, the cryptographic key stored only within the volatile memory and inaccessible to devices external to the hardware security module;
- store, using the server computer, the cryptographic key within only the volatile memory; and
- responsive to detecting interruption of an electrical power supply to the server computer, delete, using the server computer, the stored cryptographic key from the volatile memory to prevent access to the cryptographic key.

17. The non-transitory computer-readable storage medium of claim 16, further comprising instructions to:
- generate, using the server computer, a log representing performance of the cryptographic transaction;
- detect, using the log, a security breach of the server computer; and
- responsive to the detecting of the security breach of the server computer, transmit a power down signal to a power distribution unit to interrupt the electrical power supply to the server computer.

18. The non-transitory computer-readable storage medium of claim 16, further comprising instructions to:
- generate, using a sensor, sensor signals indicative of a security breach of the server computer;
- detect, using the sensor signals, the security breach; and
- responsive to the detecting of the security breach, transmit a power down signal to a power distribution unit to interrupt the electrical power supply to the server computer.

19. The non-transitory computer-readable storage medium of claim 16, wherein the server computer is one of a plurality of server computers electrically connected to a power distribution unit using a plurality of power slots, the instructions further comprising instructions to:
- interrupt, using a distinct power slot of the plurality of power slots, the electrical power supply to the server computer, while providing, using other power slots of the plurality of power slots, the electrical power supply to other server computers of the plurality of server computers.

20. The non-transitory computer-readable storage medium of claim 16, further comprising instructions to:
- receive, using the server computer, information representing the cryptographic transaction, the information comprising an encrypted key associated with the cryptographic transaction, wherein the deriving of the cryptographic key comprises:
- generating, using the encrypted key, the cryptographic key.

* * * * *